Oct. 6, 1964 S. H. R. VISSER 3,151,380

METHOD OF MANUFACTURING POINT ELECTRODES

Filed Sept. 24, 1962 2 Sheets-Sheet 1

INVENTOR
SIMON H.R. VISSER

BY

AGENT

Oct. 6, 1964 S. H. R. VISSER 3,151,380

METHOD OF MANUFACTURING POINT ELECTRODES

Filed Sept. 24, 1962 2 Sheets-Sheet 2

INVENTOR
SIMON H. R. VISSER

BY Frank R. Jifari
AGENT

United States Patent Office 3,151,380
Patented Oct. 6, 1964

3,151,380

METHOD OF MANUFACTURING POINT ELECTRODES

Simon Henricus Rudolphus Visser, Mollenhutseweg, Nijmegen, Netherlands, assignor to North American Philips Company, Inc., New York, N.Y., a corporation of Delaware Filed Sept. 24, 1962, Ser. No. 225,589
Claims priority, application Netherlands Sept. 29, 1961
10 Claims. (Cl. 29—25.3)

Figure 1:
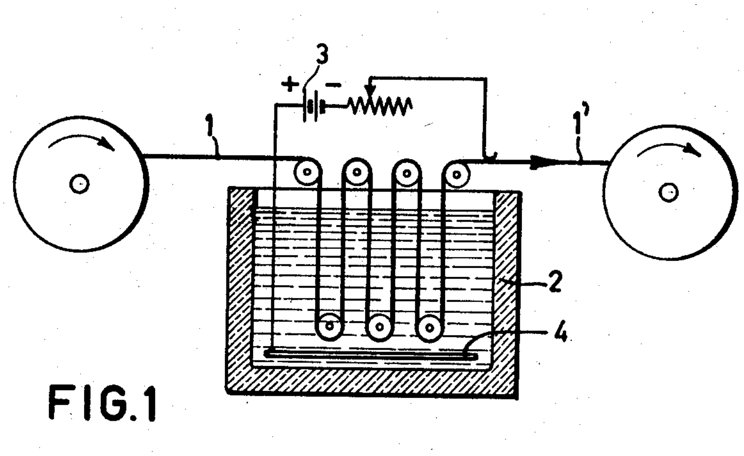

This invention relates to a method of manufacturing point electrodes for semiconductor devices, in particular crystal diodes in which the electrode is bonded or fused to a semiconductor crystal surface.

The electrode in such devices generally comprises a wire-shaped metal core, hereinafter termed "core wire," which is provided, at least at one end, with a point which is covered with a layer of metal which is softer and has a melting point lower than that of the metal of the core. This latter metal is hereinafter termed "core metal," and the covering metal "cladding metal." Such point electrodes or whiskers may be used in crystal diodes which comprise, for example, a semiconductor body of silicon or germanium on which the tip of the point electrode is pressed. Often the tip is melted and bonded to the semiconductor body, which method is sometimes termed "forming." Molybdenum is usually used as the core metal, but also other metals may be used, for example, tungsten. Noble metals often constitute the cladding metal, for example gold and platinum, to which significant impurity doping elements may be added, for example indium, gallium, antimony or arsenic. A gallium-doped, gold-plated molybdenum wire has proved highly satisfactory.

If it were not necessary for the tip of the electrode to be covered with the cladding metal, it would be possible to cover the core wire continuously with cladding metal, cut the wire into pieces to the length desired, and provide each piece with a pointed end, or end of reduced diameter. Such electrodes, which are described, for example, in British Patent 836,754 or in U.S. Patent 2,429,222, when pressed against a semiconductor body establish contact between the latter and the core metal.

However, in many cases, it is desirable that the semiconductor body is in contact only with the cladding metal, and in those cases it is necessary first to cut the core wire into pieces, provide these pieces with pointed ends, and only then provide the cladding metal on the points, which is described, for example, in British Patent 686,907. This latter method, however, is far more expensive and time consuming, because providing a layer of cladding metal usually requires at least a few minutes, and because such a method can, naturally, more easily be applied once to a long piece of wire than repeatedly to many small cut and pointed pieces.

The main object of the invention is, among other things, to provide a method by which a point electrode having a tip coated with a layer of cladding metal can be obtained in a simple manner from a cladded wire.

According to the invention, a core wire continuously covered with cladding metal is subjected to pulling forces while undergoing local heating to a temperature at least of the order of magnitude of the melting temperature of the cladding metal until the core wire and cladding rupture and separate into two parts. The temperature, at least at the instant of breaking, preferably lies above the melting point of the cladding metal. It has appeared that in such circumstances, the core wire on either side of the fracture at the newly-formed end surfaces is covered with the cladding metal. Consequently, point electrodes manufactured in this manner have properties similar to those which are manufactured by coating a pointed core wire with cladding metal. Because local heating is used, the point of fracture can be predetermined. Although this heating may be effected in various manners, for example by means of an oxyhydrogen flame or by intensive local heat radiation, according to a preferred embodiment of the invention, heating is effected by passing electric current through the wire. With such heating, the part of the wire where fracture takes place is heated automatically to a temperature higher than the remainder of the wire by virtue of the reduction in area or diameter as the wire stretches before breaking, which promotes the flow of the cladding metal over the two newly-formed end surfaces.

Heating may be effected by using alternating current, but I have found that the quality of the coating on the newly-formed end surfaces is dependent on the polarity of the current at the instant of breaking of the wire. Therefore, the wire is preferably heated by using direct current. Then, preferably that end of the separated wire which was connected to the negative pole of the source of direct current is provided on a semiconductor body in a semiconductor device. In general, when using the invention, a large number of point electrodes will be produced from a single long piece of wire. Each of these pieces of wire will have two ends of which one will comply with the foregoing polarity requirement and can be used, and of which one may be less appropriate. Thus, when the choice is available, the end connected negatively should be used.

The shape of the resulting tips is dependent on the properties of the material of the core wire. As a rule, in order to obtain a favorable shape, it is preferred that the core wire is capable of a certain amount of stretching, or elongation prior to fracture. According to a preferred embodiment, the material of the core wire can be stretched before fracturing at least about 10% and preferably between about 15% and 20% of its original length. This can be ensured by initially choosing a metal with this property, or subjecting the wire to a heat treatment, such as annealing, to obtain this result.

As already noted, the cladding metal may contain one or more doping elements. These may be provided in or on the cladding before the core wire is separated, but they may also be provided on the tip after separation, which is to be preferred if they will not withstand high temperatures, which is the case, for example, with the element gallium.

In order that the invention may readily be carried into effect, one embodiment thereof will now be described more fully, by way of example, with reference to the accompanying drawing in which:

FIG. 1 diagrammatically shows apparatus for continually coating a core wire with cladding metal.

Figure 2:
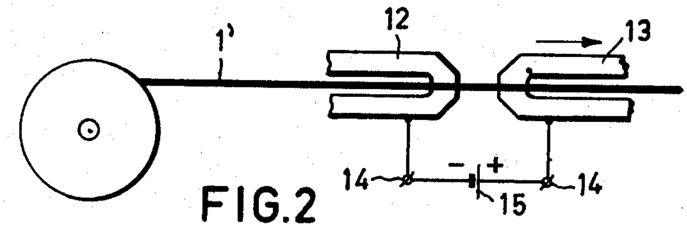

FIG. 2 diagrammatically shows a device for separating or severing the wire.

FIGS. 3*a*, 3*b*, 3*c* and 3*d* show the wire in cross-section on an exaggerated scale during successive steps in its manufacture.

Figure 4:
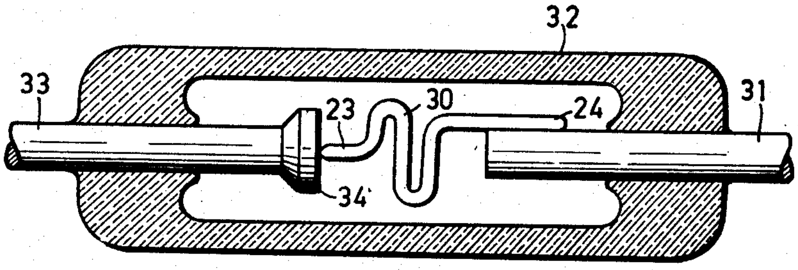

FIG. 4 is a cross-section of a crystal diode made with the electrode of the invention.

A piece of molybdenum wire 1, 100$\mu$ thick, is passed through a plating bath 2 at a rate of approximately 30 m./min., the bath containing a solution 3% by weight of potassium cyanoaurite $K[Au(Cn)_2]$ in water. The bath temperature is 60° C. The wire is connected to the negative pole of a battery 3. The positive pole of this battery is connected to an anode 4 which lies in the bath. The length of the part of the wire which is dipped is approximately 250 cm. and the current supplied by the battery is 800 ma. The thickness of the resulting gold layer or cladding amounts to approximately ½$\mu$.

The unclad wire is first fired for about half a second in a hydrogen atmosphere at approximately 1400° C., and again heated to 1100° C., also in hydrogen, for about half a second after the gold layer is plated on. These thermal (annealing) treatments are chosen empirically to influence the mechanical properties of the core wire so that the resulting wire will stretch or elongate before fracturing between 15% and 20%. The gold-clad wire 1' is fed, as shown diagrammatically in FIG. 2, between two tongs or holders made of steel or copper 12 and 13. The length of the wire between the tongs is approximately 4 mm. By connections 14, the tongs 12, 13 are connected to a current source 15, the voltage of which is from 1 to 2 v. The tong 13 is moved to the right with a force of the order of half the tensile strength of the wire at room temperature, for instance half a kilogram, while tong 12 remains fixed and the wire is simultaneously heated by the current passage until it fractures. In this case, the tongs 12 and 13 are manufactured from copper to promote heat dissipation from the clamped parts of the wire, as a result of which the part of the wire between the two tongs obtains a temperature gradient which steeply increases towards the center between the tongs. As a result of this, fracture occurs almost exactly in the middle between the two tongs 12, 13. The heating time, which takes place in air, is very short, roughly 50–100 milliseconds.

Figure 3D:
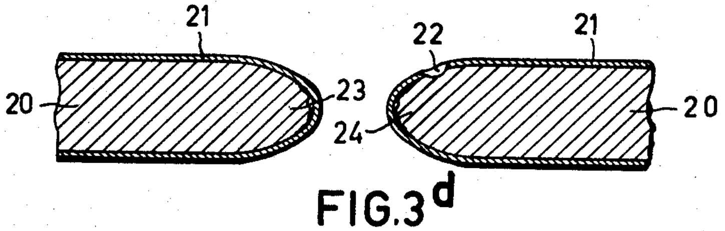
Figure 3A:
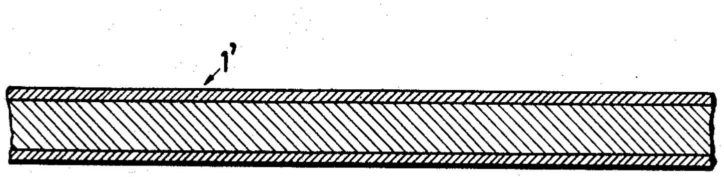
Figure 3B:
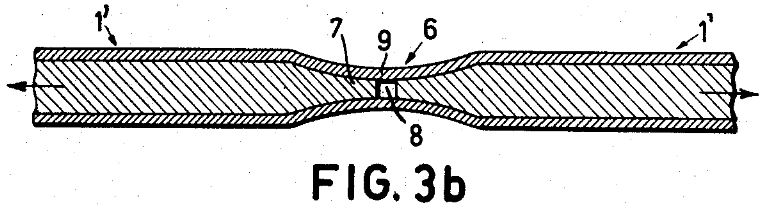
Figure 3C:
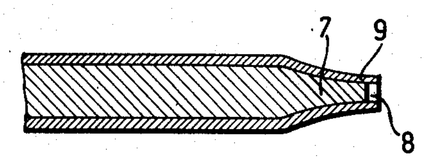

FIG. 3*a* illustrates the clad wire 1' prior to fracture. FIG. 3*b* illustrates the wire structure during the pulling and heating treatment. The forces tend to concentrate at the midpoint of the wire between the holders, causing it to stretch or elongate at the midpoint producing a region of reduced cross-section 6, which intensifies the heating at that point. The core 7, probably because it is harder than the coating 9, seems to fracture at 8 before the coating, which may remain intact for a short period. If the heating were not present, the structure in FIG. 3*c* would result, with the broken end of the wire 7 being tapered or pointed, and with the broken cladding 9 protruding over the end of the core 7. However, due to the heating, the cladding 9 melts during the fracture and flows over the broken end 8 of the core reforming the gold cladding over the now pointed wire ends.

FIG. 3*d* diagrammatically shows the two ends of the resultant wire. Both core wires 20 may have a truncated tip which is coated with gold cladding metal 21. The tips of the core are shown diagrammatically as having a roughened surface but, in practice, this surface may be substantially smooth. It appears that the end 23 of that piece of wire which was connected to the negative pole and which is shown on the left-hand side of FIG. 3 in general has the more regular shape. The end 24 which was connected to the positive pole sometimes has small crater-like apertures 22 in the cladding layer 21. These ends may still be used as electrodes but they sometimes give rise to more rejects. Thus, it is preferred to use the other end. It will be understood that the process illustrated in FIG. 2 is continuous, in that, the right piece is removed, the left piece moved the desired distance to the right holder 13, and the process repeated to make a second electrode. Thus, each severed piece of wire will have points at opposite ends, with one end 23 first being formed while connected to a pole of the current source 15 of negative polarity, and the other end 24 later being formed while connected to a pole of positive polarity. The cladding metal is now provided, at its tip, with gallium as doping element by dipping a number of the electrode wires in a solution of 10% by weight of gallium sulphate, $Ga(SO_4)_3$, in water at room temperature, a current of 1.2 ma. being passed through each wire for 1 minute.

In this manner, pieces of wire 30 are obtained which may be used in crystal diodes by welding them to a lead-in conductor 31 consisting of nickel iron, see FIG. 4, which is sealed in one end of a glass envelope 32. A second conductor 33 is sealed in the other end and has mounted on its inner end a semiconductor crystal 34 which in the present case may consist of germanium of the n-conductivity type. The cladded pointed end 23 is pressed against the crystal surface, in the usual way, and bonded thereto by the passage of electric current, as is well known in the art.

Within the scope of the invention many variations are possible of course with respect to the materials used and the dimensions. In general, optimum results are obtained by running a few simple tests to determine, for example, the annealing treatment required to ensure proper stretching of the wire before fracturing, and the necessary currents required to flow the cladding over the broken core wire ends. These are matters well within the skill of those in this art following the principles and examples set forth herein.

What is claimed is:

1. A method of manufacturing point electrodes for semiconductor devices, comprising the steps of providing a core wire with a continuous cladding of a metal which is softer than and has a melting point lower than that of the core metal, and breaking the clad wire while subjecting same to local heating to a temperature at least of the order of magnitude of the melting temperature of the cladding metal.

2. A method as claimed in claim 1, in which the heating is effected by the passage of an electric current through the wire.

3. A method as claimed in claim 2, in which a direct current is passed through the wire.

4. A method as claimed in claim 3, in which that end of the separated wire which was connected negatively to the source of direct current is provided in a semiconductor device on a semiconductor body.

5. A method as claimed in claim 1, in which molybdenum wire is used as the core wire.

6. A method as claimed in claim 1, in which a wire is used which will stretch at least 10% before fracturing.

7. A method as claimed in claim 1, in which gold is used as the cladding metal to which at least one doping element is added.

8. A method of manufacturing point electrodes for semiconductor devices, comprising the steps of providing a core wire with a continuous cladding of a metal which is softer than and has a melting point lower than that of the core metal and the wire exhibits the property of stretching between about 10% and 20% before fracturing when pulled apart, and pulling apart portions of the clad wire while simultaneously passing direct current through the wire of a value sufficient to raise the temperature of a midpoint of the wire to the melting temperature of the cladding metal until the wire fractures, producing a severed wire portion having a pointed end covered with the cladding metal.

9. A method as set forth in claim 8 wherein the wire end connected to the negative pole of the direct current source is bonded to the surface of a semiconductor crystal.

10. A method as set forth in claim 8 wherein the clad wire comprises gold-clad molybdenum.

References Cited in the file of this patent

UNITED STATES PATENTS 2,009,206 Rosner ---------------- July 23, 1935

FOREIGN PATENTS 220,338 Australia --------------- July 18, 1957